US012400814B2

(12) United States Patent
Raab et al.

(10) Patent No.: US 12,400,814 B2
(45) Date of Patent: Aug. 26, 2025

(54) ELECTRONIC MODULE AND APPARATUS

(71) Applicant: Siemens Aktiengesellschaft, Munich (DE)

(72) Inventors: Oliver Raab, Deutschland (DE); Markus Schwarz, Munich (DE); Hans Santos Wilke, Parsdorf (DE); Stefan Kiefl, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/246,830

(22) PCT Filed: Sep. 28, 2021

(86) PCT No.: PCT/EP2021/076644
§ 371 (c)(1),
(2) Date: Mar. 27, 2023

(87) PCT Pub. No.: WO2022/069469
PCT Pub. Date: Apr. 7, 2022

(65) Prior Publication Data

US 2023/0360872 A1 Nov. 9, 2023

(30) Foreign Application Priority Data

Sep. 30, 2020 (DE) ................................ 20199173.4

(51) Int. Cl.
*H01H 59/00* (2006.01)

(52) U.S. Cl.
CPC . *H01H 59/0009* (2013.01); *H01H 2059/0063* (2013.01)

(58) Field of Classification Search
CPC ....... H01H 59/0009; H01H 2059/0063; H01H 2001/0084
See application file for complete search history.

(56) References Cited

U.S. PATENT DOCUMENTS 5,619,061 A * 4/1997 Goldsmith .............. H01G 5/40 257/415
6,016,092 A * 1/2000 Qiu ........................ H01P 1/127 335/4

(Continued)

FOREIGN PATENT DOCUMENTS

DE 198 54 450 6/2000 ............ H01H 59/00
EP 2 398 028 12/2011 ............ H01H 59/00

OTHER PUBLICATIONS

Search Report for International Application No. PCT/EP2021/076644, 16 pages, Jan. 27, 2022.

(Continued)

*Primary Examiner* — Bernard Rojas
(74) *Attorney, Agent, or Firm* — Slayden Grubert Beard PLLC

(57) ABSTRACT

Various embodiments of the teachings herein include an electronic module. The module may include: an electrical circuit; a first MEMS switch having a first control contact with a first switching threshold voltage; and a second MEMS switch having a second control contact with a second switching threshold voltage different than the first. The first control contact and the second MEMS switch are linked to the electrical circuit.

12 Claims, 3 Drawing Sheets

(56) References Cited

U.S. PATENT DOCUMENTS

| | | | | |
|---|---|---|---|---|
| 6,440,767 | B1 * | 8/2002 | Loo | H01H 59/0009 257/419 |
| 6,624,720 | B1 * | 9/2003 | Allison | H01P 1/127 342/373 |
| 6,750,745 | B1 * | 6/2004 | Wei | H01H 50/005 335/78 |
| 8,659,326 | B1 | 2/2014 | Claydon | 327/108 |
| 2004/0056740 | A1 * | 3/2004 | Ma | H01H 59/0009 333/262 |
| 2008/0174390 | A1 | 7/2008 | Nguyen | 333/262 |
| 2014/0158506 | A1 | 6/2014 | Yoon | 200/181 |
| 2019/0172672 | A1 | 6/2019 | Bauer et al. | |

OTHER PUBLICATIONS

Japanese Decision to Grant, Application No. 2023-519121, 5 pages, Oct. 17, 2024.

* cited by examiner

ELECTRONIC MODULE AND APPARATUS

CROSS-REFERENCE TO RELATED APPLICATIONS

This application is a U.S. National Stage Application of International Application No. PCT/EP2021/076644 filed Sep. 28, 2021, which designates the United States of America, and claims priority to EP Application No. 20199173.4 filed Sep. 30, 2020, the contents of which are hereby incorporated by reference in their entirety.

TECHNICAL FIELD

The present disclosure relates to electronic modules. Various embodiments of the teachings herein include electronic modules having an electrical circuit and at least one first MEMS switch.

BACKGROUND

MEMS switches regularly comprise a bending element, for example a bending beam, which can be deflected in particular electrostatically. The bending element carries electrical switching contacts which, on account of the deflection, can be brought into contact with correspondingly arranged mating contacts and can thus provide or interrupt an electrically conductive connection. Electronic modules having MEMS switches thus have switching functionalities which allow a galvanic isolation between a drive circuit used to deflect the bending element of the MEMS switch and a load circuit that is switched using the MEMS switch.

In the case of electronic modules, it is often desirable to monitor voltages of a load circuit. Consumers located in the load circuit, for instance, can thus be protected against over- or under-voltages. Such monitoring of voltages may also be necessary for the protection of switches themselves. Such monitoring of voltages is regularly provided in controllers of industrial apparatuses, in particular.

Analog-to-digital converters are known for the purpose of monitoring, that is to say measuring, voltages, but said converters do not allow a galvanic isolation from a load circuit, unless additional components, such as optocouplers, for example, are provided. A galvanically isolated voltage measurement can be effected by means of capacitive voltage measurements. However, that necessitates complex evaluation electronics. Moreover, such a capacitive voltage measurement is accomplished only in AC voltage applications. In principle, MEMS voltmeters can also be provided for voltage measurement purposes. However, such MEMS voltmeters also require complex evaluation electronics and additional components.

SUMMARY

The teachings of the present disclosure provide an improved electronic module which makes possible a galvanically isolated voltage measurement. In particular, the electronic module may be able to be manufactured without additional process costs or process complexities. Furthermore, some embodiments include an improved apparatus, with an open-loop and/or closed-loop control module, which comprises such an electronic module. For example, some embodiments include an electronic module having an electrical circuit (70) and at least one first MEMS switch (10) having at least one first control contact (50) having a first switching threshold voltage and at least one second MEMS switch (10') having a second control contact (50') having a second switching threshold voltage different than the first, wherein the control contacts (50, 50') of the first MEMS switch (10) and the second MEMS switch (10') are linked to the electrical circuit (70).

In some embodiments, the first MEMS switch switches a first signal, which indicates that the first switching threshold voltage is exceeded, and the second MEMS switch switches a further, second signal, which indicates that the second switching threshold voltage is exceeded, wherein the electronic module comprises a signal device, which outputs at least one signal ($V_{low}$, $V_{high}$) dependent on a switching position of the first MEMS switch (10) and a switching position of the second MEMS switch (10').

In some embodiments, the first control contact (50) and the second control contact (50') are linked to an identical voltage potential of the electrical circuit (70).

In some embodiments, the first control contact (50) and the second control contact (50') are linked to partial voltages of a voltage divider of the electrical circuit (70).

In some embodiments, the first and second MEMS switches each have a source contact and a drain contact, wherein source and drain contacts of the first MEMS switch are conductively connectable along a first conduction path by means of the first switching contact and the source and drain contacts of the second MEMS switch are conductively connectable along a second conduction path by means of the second switching contact, wherein the first and second conduction paths are connected or connectable in parallel with one another.

In some embodiments, the electronic module comprises at least one third MEMS switch having a third control contact having a switching threshold voltage different than the first and/or second switching threshold voltage.

In some embodiments, the first MEMS switch (10) and the second MEMS switch (10') and/or the third MEMS switch or one or more further MEMS switches are/is formed with a respective bending element (30), in particular with a respective bending beam.

In some embodiments, a galvanically isolated voltage measurement is possible.

In some embodiments, at least the first MEMS switch and the second MEMS switch are formed with a respective bending element, in particular a respective bending beam, and the first and second MEMS switches comprise at least two switching contacts per bending element, which are conductively connected to one another and which can establish or interrupt an electrically conductive connection.

In some embodiments, the signal device compares a voltage of the electronic circuit with at least one voltage interval, wherein the first MEMS switch and/or the second MEMS switch each define(s) a limit of the voltage interval.

In some embodiments, the first switching threshold voltage and/or the second switching threshold voltage or a further switching threshold voltage are/is defined in each case by means of at least one geometric and/or material-dictated parameter (h, b, L) of the respective MEMS switch (10, 10'), in a particular a length (L) and/or width (b) and/or thickness (h) of a bending element and/or an electrode spacing (g) and/or a dielectric and/or a layer stress and/or a layer material of the MEMS switch (10, 10').

In some embodiments, the electrical circuit (70) comprises a further MEMS switch (120) and the electrical circuit (70) forms a load circuit of the further MEMS switch (120).

As another example, some embodiments include an apparatus, in particular having an open-loop and/or closed-loop control module, having an electronic module (60) as described herein.

BRIEF DESCRIPTION OF THE DRAWINGS

The teachings of the present disclosure are explained in greater detail below on the basis of an exemplary embodiment illustrated in the drawing. In the figures.

DETAILED DESCRIPTION

Figure 1:
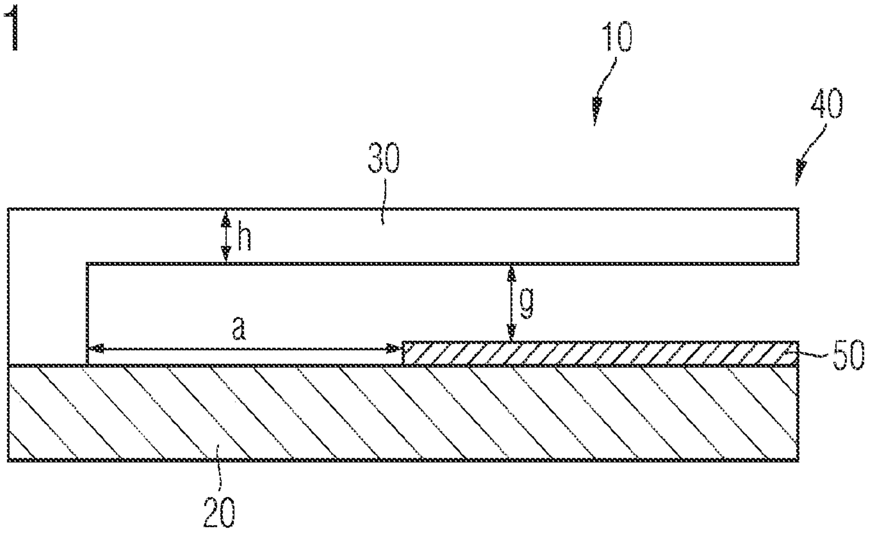
FIG. 1 shows a first MEMS switch of the electronic module incorporating teachings of the present disclosure schematically in cross section.

In some embodiments, an electronic module comprises an electrical circuit and at least one first MEMS switch having at least one first control contact having a first switching threshold voltage and also at least one second MEMS switch having a second control contact having a second switching threshold voltage different than the first. The control contacts, i.e. first control contact and control contact, of the first MEMS switch and the second MEMS switch are linked to the electrical circuit.

In this way, by means of the first MEMS switch and by means of the second MEMS switch, it is thereby possible to measure voltages in the electrical circuit by virtue of the first MEMS switch and/or the second MEMS switch being switched by account of the first switching threshold voltage and/or the second switching threshold voltage being exceeded. On account of the different first and second switching threshold voltages, the electrical voltage in the electrical circuit can thus be deduced.

Therefore, the voltage measurement is effected by means of a first and a second MEMS switch. Consequently, the voltage measurement is effected in a manner galvanically isolated from the electrical circuit. Only the first control contact and the second control contact have to be linked to the electrical circuit. Since the voltage measurement can be effected by means of MEMS switches, it is possible in particular to provide electrical circuits with further MEMS switches with the first MEMS switch and the second MEMS switch. Process steps for providing other components are not required. In other words, if MEMS switches are provided anyway in the case of the electrical circuit in the case of electronic modules, the first MEMS switch and the second MEMS switch for the purpose of measuring voltages can also be easily integrated into the manufacturing process of the electronic module.

The electronic module incorporating teachings of the present disclosure may dispense with additional components, such as optocouplers, for example, for voltage measurement purposes. Consequently, despite a minimally increased space requirement owing to the additional MEMS switch(s), the overall result is a space saving and thus also a cost saving.

In some embodiments, the first MEMS switch is configured to switch a first signal, which indicates the first switching threshold voltage being exceeded, and the second MEMS switch is configured to switch a further, second signal, which indicates the second switching threshold voltage being exceeded, wherein the electronic module comprises a signal device, which outputs at least one signal dependent on a switching position of the first MEMS switch and a switching position of the second MEMS switch. The signal device can output respective signals dependent on the switching position of the first MEMS switch and on the switching position of the second MEMS switch or can output a signal dependent both on the switching position of the first MEMS switch and on the switching position of the second MEMS switch.

In some embodiments, the first control contact and the second control contact are linked to an identical electrical potential of the electrical circuit. Expediently, moreover, respective meeting contacts at a common ground potential are assigned to the first control contact and to the second control contact. In this way, by means of the first MEMS switch and by means of the second MEMS switch, a voltage interval can be found in which, by means of the first and second MEMS switches, it is easily possible to check whether the voltage of the electrical circuit is within or outside the voltage interval and, if appropriate, what side of the voltage interval the voltage of the electrical circuit is on.

In some embodiments, the first control contact and the second control contact are linked to partial voltages of a voltage divider of the electrical circuit. Even from partial voltages of a voltage divider, the first switching threshold voltage and the second switching threshold voltage can be related to one another. Accordingly, in this configuration, too, voltages can be measured by means of the first MEMS switch and the second MEMS switch.

In some embodiments, the first MEMS switch and the second MEMS switch are connected in parallel with one another. In this configuration, a voltage interval can be formed very simply with the first switching threshold voltage of the first MEMS switch and the second switching threshold voltage of the second MEMS switch, such that on account of the switching processes of the first MEMS switch and the second MEMS switch, a position of the voltage of the electrical circuit relative to the voltage interval is determinable in a simple manner.

In this case, the expression that the first and second MEMS switches are connected in parallel with one another means that the first and second MEMS switches each have a source contact and a drain contact, wherein source and drain contacts of the first MEMS switch are conductively connectable along a first conduction path by means of the first switching contact and the source and drain contacts of the second MEMS switch are conductively connectable along a second conduction path by means of the second switching contact, wherein the first and second conduction paths are connected or connectable in parallel with one another.

The source and drain contacts of the respective first and/or second MEMS switch in each case form those switching contacts which can be electrically conductively connected or electrically isolated in each case by means of the switching of the respective first and/or second MEMS switch. In line with this terminology of the development described above, the first and second control contacts may each be referred to as a gate contact of the first and second MEMS switches.

In some embodiments, the electronic module comprises a signal device, which outputs at least one signal dependent on a switching position of the first MEMS switch and a switching position of the second MEMS switch. In this development of the invention, the signal device may be the signal device already described above. The signal device can output a respective signal dependent on the switching position of the first MEMS switch and on the switching position of the second MEMS switch or can output a signal dependent both on the switching position of the first MEMS switch and on the switching position of the second MEMS switch. If, for instance, the first MEMS switch and the second MEMS switch are linked by the first and second control contacts to an identical voltage potential of the electrical circuit, and if the first and second MEMS switches are connected in parallel with one another, then the associated MEMS switch is switched in the event of the lowest switching threshold voltage being exceeded by the voltage of the electrical circuit. The corresponding MEMS switch can then switch a signal which indicates that the associated switching threshold voltage is exceeded. If the voltage of the electrical circuit reaches the further switching threshold voltage of the associated MEMS switch, then this MEMS switch also turns on and can actively switch a further, second signal, for instance, which indicates that the voltage exceeds the associated switching threshold voltage.

In some embodiments, the electronic module comprises at least one third MEMS switch having a control contact having a switching threshold voltage different than the first and/or second switching threshold voltage. In this way, the resolution of the voltage measurement or else the measurement range of the voltage measurement can be increased by means of further switching threshold voltages. In some embodiments, a fourth MEMS switch having a control contact having a switching threshold voltage different than the first and/or second and/or third switching threshold voltage can also be part of the electronic module.

In some embodiments, the first MEMS switch and/or the second MEMS switch and/or the third MEMS switch and/or further MEMS switches and/or all of the MEMS switches are/is formed with a respective bending element, e.g. with a respective bending beam. In this way, the control contact forms an electrode which deflects the bending element, in particular the bending beam. Expediently, the bending element, in particular the bending beam, carries at least one switching contact which can be used to provide a conductive connection on account of a deflection of the bending element.

In some embodiments, a galvanically isolated voltage measurement is possible. A galvanically isolated voltage measurement is possible in particular by means of a development described below. In other words, a galvanically isolated voltage measurement is possible in such a way that the features of the development of the invention described below are realized:

In some embodiments, at least the first MEMS switch and the second MEMS switch are formed with a respective bending element, in particular a respective bending beam, and the first and second MEMS switches preferably comprise at least two switching contacts per bending element, which are conductively connected to one another and which can establish or interrupt an electrically conductive connection. By means of the switching contacts, the MEMS switches of the electronic module according to the invention, in a manner galvanically isolated from the control contacts of the electronic module, can switch signals, in particular the above-described first signal, which indicates that the first switching threshold voltage is exceeded, and the second signal, which indicates that the second switching threshold voltage is exceeded. Voltages present at the control contacts can easily be measured by means of the switched signals, in particular by means of the first and/or second signal.

In some embodiments, the voltage present at the first control contact is rated relative to the bending element of the first MEMS switch, i.e. the voltage present at the control contact is rated relative to a potential, in particular zero potential, of the bending element of the first MEMS switch. In some embodiments, the voltage present at the second control contact is rated relative to a potential, in particular zero potential, of the bending element of the second MEMS switch.

In some embodiments, the signal device compares a voltage of the electronic circuit with at least one voltage interval, wherein the first MEMS switch and/or the second MEMS switch each define(s) a limit of the voltage interval. As already explained, a voltage interval can be formed by means of the first and/or second MEMS switch and the voltage of the electrical circuit can be compared with said voltage interval.

In some embodiments, the first switching threshold voltage and/or the second switching threshold voltage and/or a further switching threshold voltage(s) are/is defined by means of at least one geometric and/or material-dictated parameter of the MEMS switch. In some embodiments, the geometric and/or material-dictated parameter is a length and/or width and/or thickness of a bending element and/or an electrode spacing and/or a dielectric and/or a layer stress and/or a layer material of the MEMS switch. In this regard, a length or width or thickness of a bending element can define the switching threshold voltage in a simple manner. An electrode spacing or a dielectric or a layer stress or a layer material influence the switching threshold voltage at the MEMS switch in a similar way.

In some embodiments, the electrical circuit comprises a further MEMS switch and the electrical circuit forms a load circuit of the further MEMS switch. In this way, firstly, the load circuit of the electronic module is switched by means of a MEMS switch and a voltage of the electrical circuit is measured by means of MEMS switches. Accordingly, the switchings of the load circuit and the measurement of the voltage of the load circuit are realized by means of the same technology.

In some embodiments, the apparatus comprises in particular an open-loop and/or closed-loop control module. The apparatus comprises an electronic module as described above. In some embodiments, the electronic module is part of the open-loop and/or closed-loop control module.

Figure 2:
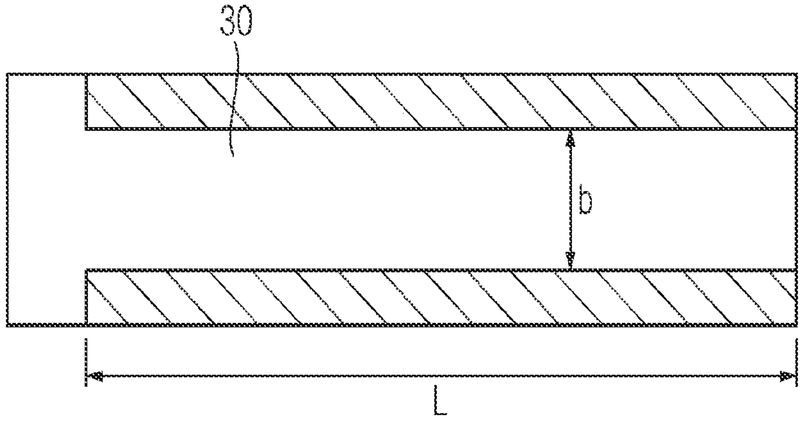
FIG. 2 shows the first MEMS switch in accordance with FIG. 1 schematically in a plan view.

The MEMS switch 10—illustrated in FIG. 1—of the electronic module (not illustrated in FIGS. 1 and 2) according to the invention comprises a substrate 20 and a bending beam 30 attached thereto in an articulated manner. The bending beam 30 is deflectable by a free end 40 in the direction of the substrate 20. For the purpose of deflecting the free end 40 of the bending beam 30, an electrode 50 is applied in planar fashion on the substrate 20 at the surface thereof facing the bending beam 30, said electrode subjecting a counter electrode (not explicitly illustrated in the drawing) situated on the bending beam 30 to an electrostatic attraction, such that the free end 40 of the bending beam 30 can move toward the electrode 50 and thus toward the substrate 20. For deflection purposes, a voltage is applied to the electrode 50, which forms a first control contact of the first MEMS switch 10, whereupon the bending beam 30 deflects.

In some embodiments, the bending beam 30 has two switching contacts at its free end 40, which switching contacts are conductively connected to one another perpendicular to the plane of the drawing and are situated at the free end 40, one each in front of the plane of the drawing and behind the plane of the drawing. The two switching contacts may also be referred to as source and drain contacts. The switching contacts can thus establish or interrupt an electrically conductive connection perpendicular to the plane of the drawing. In the exemplary embodiment illustrated, an electrically conductive connection is established if the free end 40 of the bending beam 30 is moved toward the substrate 20. The deflection of the free end 40 of the first MEMS switch 10 necessitates a voltage forming a first switching threshold voltage at the electrode 50 forming the first control contact. Said first switching threshold voltage is dependent on the geometric dimensions of the bending beam 30. The greater the length L of the bending beam 30 (see FIG. 2), the more easily the bending beam 30 can move toward the substrate 20. In other words, as the length L increases, the required switching threshold voltage for deflecting the free end 40 of the first MEMS switch 10 decreases.

By contrast, as the width b increases (see FIG. 2), the bending stiffness of the bending beam 30 of the first MEMS switch 10 increases, such that the first switching threshold voltage correspondingly increases. Furthermore, the first switching threshold voltage increases with increasing distance g between the bending beam 30 and the substrate 20. By means of the geometric dimensions, the first switching threshold voltage can thus be tailored to the first MEMS switch 10. The electronic module 60 according to the invention (FIG. 3) does not just solely comprise a first MEMS switch 10, rather the electronic module 60 additionally comprises a second MEMS switch 10', in which the bending beam 30' is provided with a shorter length L, such that a higher voltage for switching the second MEMS switch 10' has to be applied to a second control contact 50' of the second MEMS switch 10'. Consequently, the second MEMS switch 10' has a higher switching threshold voltage than the first MEMS switch 10.

The first MEMS switch 10 and the second MEMS switch 10' are each arranged at the same potential of a load circuit, comprising firstly a load potential $V_{LAST}$ and also a ground potential $V_{LAST,\ GND}$. The load potential $V_{LAST}$ and the ground potential $V_{LAST,\ GND}$ are each electrically conductively linked to the electrode 50 and the counter electrode—not illustrated in FIG. 1—of the first MEMS switch and also to the second control contact 50' of the second MEMS switch 10' and a second mating control contact—not illustrated in FIG. 1. Here the ground potential $V_{LAST,\ GND}$ is in each case led to the bending beams 30, 30' of the first MEMS switch 10 and of the second MEMS switch 10', while the load potential $V_{LAST}$ is in each case led to the electrode 50 situated on the substrate 20 and also the second control contact 50'. The first MEMS switch 10 and the second MEMS switch 10' can thus be switched by means of the load potential $V_{LAST}$ and also the ground potential $V_{LAST,\ GND}$.

Figure 3:
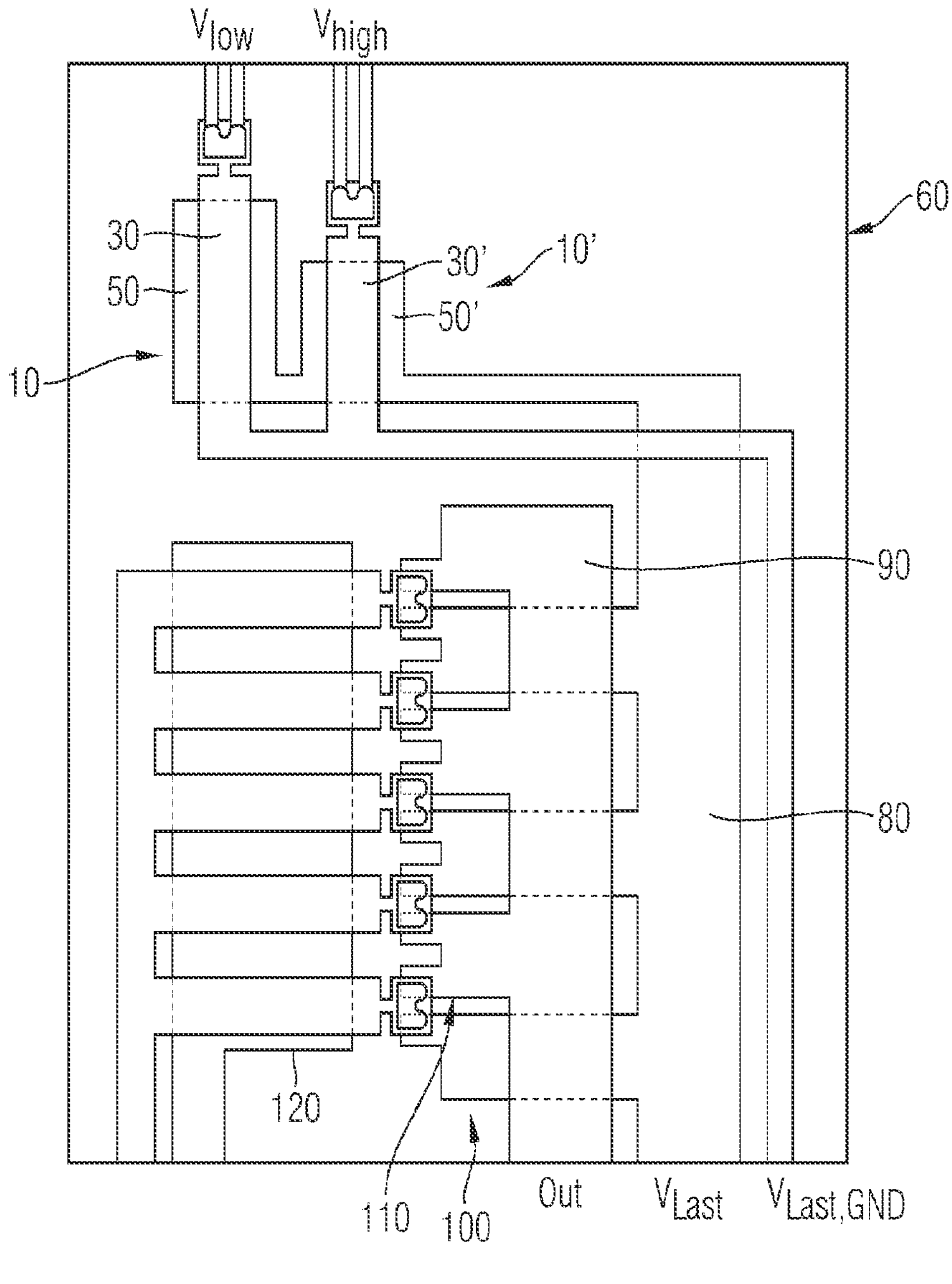
FIG. 3 shows an electronic module having the first MEMS switch in accordance with FIGS. 1 and 2 and also having a second MEMS switch schematically in a plan view.
Figure 4:
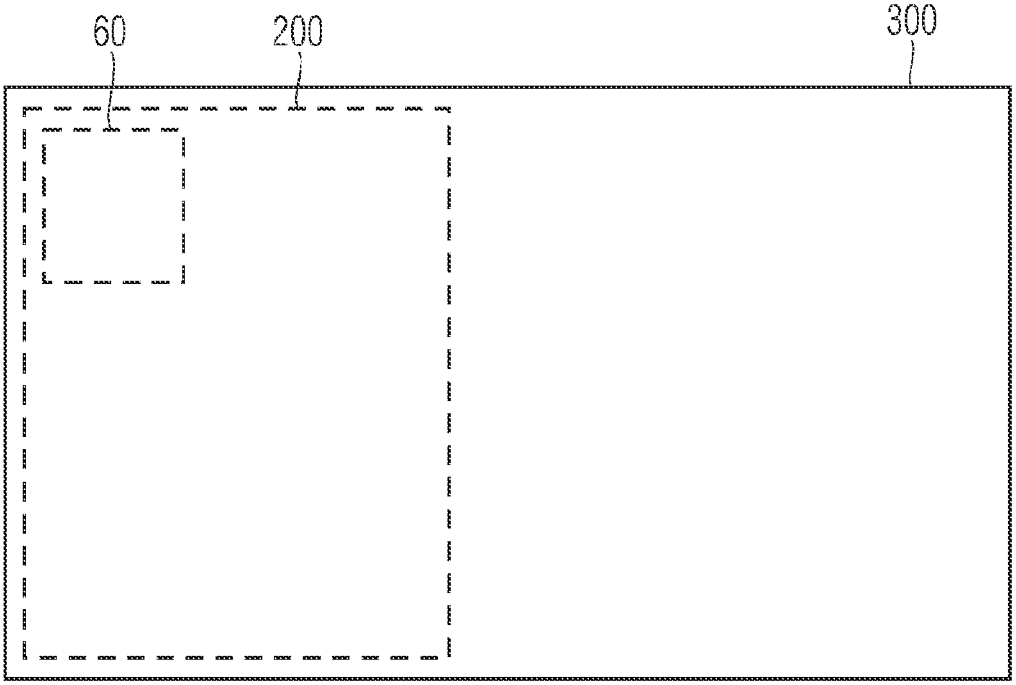
FIG. 4 shows an apparatus incorporating teachings of the present disclosure having the electronic module in accordance with FIG. 3 in a schematic basic diagram.

In the exemplary embodiment illustrated in FIG. 3, the load potential $V_{LAST}$ is contactable with an electrical outgoing line Out. For contactability, the outgoing line Out and the load potential $V_{LAST}$ are each linked to a comblike structure 80, 90, each having comb teeth 100, 110, which can be brought into electrically conductive contact with one another by means of further MEMS switches 120. If the further MEMS switches 120 are switched, then the comb teeth 100, 110 are electrically conductively contacted with one another, such that the outgoing line Out is brought to the load potential $V_{LAST}$. The voltage between the load potential $V_{LAST}$ and the ground potential $V_{LAST,\ GND}$ can be discerned by means of the first MEMS switch 10 and the second MEMS switch 10'. On account of the mutually different first threshold switching voltage and the second threshold switching voltage, the MEMS switch 10 turns on if the load voltage $V_{LAST}$ exceeds the first threshold switching voltage. In this case, the first MEMS switch 10 turns on and outputs a voltage signal $V_{low}$ by virtue of the first MEMS switch 10 turning on a first signal switching circuit $V_{low}$. Upon turn-on, a load potential $V_{LAST}$ that exceeds the first threshold switching voltage can thus be detected at the first signal switching circuit. If the load voltage $V_{LAST}$ exceeds the second threshold switching voltage, then the second MEMS switch 10' correspondingly turns on a second signal switching signal circuit, which outputs a signal $V_{high}$. On the basis of the voltage signals $V_{low}$ and $V_{high}$, which form a signal device within the meaning of the present invention, it can thus easily be ascertained whether the load potential $V_{LAST}$ is within the limits of the first threshold switching voltage and the second threshold switching voltage.

The electronic module 60 shown is part of an open-loop and closed-loop control module 200, which is in turn part of an industrial apparatus 300 incorporating teachings of the present disclosure. The industrial apparatus 300 serves for the open-loop and closed-loop control of an industrial motor, not illustrated in the drawing.

What is claimed is:

1. An electronic module comprising:
- an electrical circuit;
- a first micro-electromechanical system (MEMS) switch having a first control contact with a first switching threshold voltage; and
- a second MEMS switch having a second control contact with a second switching threshold voltage different than the first;
- wherein the first control contact and the second control contact are linked to the electrical circuit and connected to a common ground; and
- wherein a difference between the first switching threshold voltage and the second switching threshold voltage is defined by a difference in at least one geometric and/or material parameter of the respective MEMS switch selected from the group consisting of: a length of a bending element, a width of the bending element, a thickness of the bending element, an electrode spacing, a dielectric stress, a layer stress, and a layer material.

2. The electronic module as claimed in claim 1, wherein:
- the first MEMS switch switches a first signal indicating that the first switching threshold voltage is exceeded; and
- the second MEMS switch switches a further, second signal, indicating that the second switching threshold voltage is exceeded;
- the electronic module comprises a signal device generating a signal dependent on both a switching position of the first MEMS switch and a switching position of the second MEMS switch.

3. The electronic module as claimed in claim 1, wherein the first control contact and the second control contact are linked to an identical voltage potential of the electrical circuit.

4. The electronic module as claimed in claim 1, wherein the first control contact and the second control contact are linked to partial voltages of a voltage divider of the electrical circuit.

5. The electronic module as claimed in claim 1, wherein:
the first and second MEMS switches each have a source contact and a drain contact;
source and drain contacts of the first MEMS switch are conductively connectable along a first conduction path by means of the first switching contact;
source and drain contacts of the second MEMS switch are conductively connectable along a second conduction path by means of the second switching contact; and
the first and second conduction paths are connected or connectable in parallel with one another.

6. The electronic module as claimed in claim 1, further comprising a third MEMS switch having a third control contact with a switching threshold voltage different than at least one of the first or second switching threshold voltage.

7. The electronic module as claimed in claim 1, wherein the first MEMS switch and the second MEMS switch are formed with a respective bending element.

8. The electronic module as claimed in claim 1, wherein a galvanically isolated voltage measurement is possible.

9. The electronic module as claimed in claim 7, wherein:
the first MEMS switch and the second MEMS switch are formed with a respective bending element; and
the first and second MEMS switches comprise at least two switching contacts per bending element, which are conductively connected to one another and which can establish or interrupt an electrically conductive connection.

10. The electronic module as claimed in claim 1, further comprising:
a signal device to compares a voltage of the electronic circuit with at least one voltage interval; and
wherein the first MEMS switch and/or the second MEMS switch each define(s) a limit of the voltage interval.

11. The electronic module as claimed in claim 1, wherein:
the electrical circuit comprises a further MEMS switch; and
the electrical circuit forms a load circuit of the further MEMS switch.

12. An apparatus comprising:
a control module;
an electrical circuit;
a first MEMS switch having a first control contact with a first switching threshold voltage; and
a second MEMS switch having a second control contact with a second switching threshold voltage different than the first;
wherein the first control contact and the second control contact are linked to the electrical circuit and connected to a common ground;
wherein a difference between the first switching threshold voltage and the second switching threshold voltage is defined by a difference in at least one geometric and/or material parameter of the respective MEMS switch selected from the group consisting of: a length of a bending element, a width of the bending element, a thickness of the bending element, an electrode spacing, a dielectric stress, a layer stress, and a layer material.

* * * * *